No. 727,389. Patented May 5, 1903.

UNITED STATES PATENT OFFICE.

HEINRICH LAUBMANN, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION.

BLUE DYE AND PROCESS OF MAKING SAME.

SPECIFICATION forming part of Letters Patent No. 727,389, dated May 5, 1903.

Application filed October 2, 1902. Serial No. 125,711. (Specimens.)

*To all whom it may concern:*

Be it known that I, HEINRICH LAUBMANN, Ph. D., a citizen of the Empire of Germany, residing at Höchst-on-the-Main, Germany, have invented certain new and useful Improvements in Blue Dye and Process of Making the Same, of which the following is a specification.

I have found that by the action of sulfuric dialkylesters on anthrachrysone or its alkali salts new anthrachrysonedialkylethers may be obtained which by sulfonation and subsequent nitration may be transformed into the corresponding dinitroanthrachrysonedialkyletherdisulfonic acids. I have further found that by reducing these acids diamidoanthrachrysonedialkyletherdisulfonic acids are obtained which have the property of dyeing unmordanted wool blue in an acid-bath.

*I. Manufacture of anthrachrysonedialkylethers.*—To obtain these ethers, the sodium salt of anthrachrysone is heated with sulfuric dialkylesters or the aqueous solution of the sodium salt of anthrachrysone is continuously shaken, if need be, while heating with sulfuric dialkylesters. The alkylation occurs particularly smoothly if the sodium salt of anthrachrysone is heated on the water-bath or at a high temperature with sulfuric dialkylesters. Thus, for instance, anthrachrysonedimethylether is obtained if dry sodium salt of anthrachrysone is heated on the water-bath with the same or double the quantity of dimethylsulfate until said sodium salt has disappeared. The product of reaction thus obtained is boiled with water, washed, and it is then as good as pure. It is soluble with great difficulty in solvents like alcohol, ether, anilin, nitrobenzene, ethylic aceto-acetate. It crystallizes easily from anilin in brown-yellow laminæ, melting at 280 to 285° centigrade. The anthrachrysonedimethylether thus obtained is soluble in concentrated sulfuric acid to a yellow-red solution. It is almost insoluble in dilute alkali carbonates and soluble with difficulty in hot dilute fixed alkalies. The alkali salt separates from this solution when cold in form of orange needles.

*II. Manufacture of dinitroanthrachrysonedialkyletherdisulfonic acids.*—The above described anthrachrysonedialkylether may easily be transformed into dinitrosulfonic acids by heating these ethers in fuming sulfuric acid until they dissolve in water and by pouring nitric acid, preferably in form of a mixture of nitric and sulfuric acids, into the cold mass. Thus, for instance, dinitroanthrachrysonedimethyletherdisulfonic acid is obtained by heating to about 100° centigrade anthrachrysonedimethylether with ten times the quantity of fuming sulfuric acid containing twenty per cent. of anhydrid, (oleum,) until a test portion of it is clearly soluble in water. Into the cold mixture of sulfonation a quantity of nitric acid calculated to two molecules is run in as a mixture of nitric and sulfuric acids while cooling, the nitration, if need be, being completed by gently heating. The red sulfuric-acid solution solidifies gradually to a crystalline magma, which is put on ice. The hot dilute sulfuric-acid solution of the sulfonic acid is salted out with potassium chlorid or common salt. The alkali salt when cold separates in rough ruby-red crystals and may easily be purified by recrystallization. It is soluble in water to a dark-orange solution. On addition of alkali the aqueous solution becomes dark red and the neutral crystalline cinnabar-red salt soluble with difficulty is separated. In concentrated sulfuric acid the salts of the sulfonic acid dissolve with an orange color.

*III. Reduction of dinitroanthrachrysonedialkyletherdisulfonic acids.*—The reduction of dinitroanthrachrysonedialkyletherdisulfonic acids to diamidoanthrachrysonedialkyletherdisulfonic acids occurs with suitable reducing agents equally well in an acid or alkaline solution. If, for instance, the mineral-acid solution of dinitroanthrachrysonedimethyletherdisulfonic acid is gently heated in water with the quantity of stannous chlorid calculated to the two nitro groups, the reduction is complete within a short time, and the diamidodisulfonic acid may easily be salted out in a crystalline form from the intensely blue colored solution. The reduction occurs equally smoothly if the dilute alkaline solution of dinitroanthrachrysonedimethyl-etherdisulfonic acid is heated with the calculated quantity of sodium sulfid. The diamidosulfonic acid is isolated therefrom in the usual manner. Other reducing agents—like zinc-dust, iron, &c.—may also be used.

The diamidoanthrachrysonedimethyletherdisulfonic acid forms dark-blue-colored crystalline alkali salts soluble in water to a pure blue solution. The blue aqueous solution assumes a more greenish hue on addition of fixed alkali. In concentrated sulfuric acid it dissolves to an orange-yellow solution with formation of a salt. When diluted with water, the solution reassumes its blue color. The alkali salts of the sulfonic acid readily crystallize from a dilute solution of common salt. The diamidosulfonic acids are dyestuffs and dye unmordanted wool blue in an acid-bath. They are distinguished from the non-dialkylated dyestuffs of the German Patent No. 73,648 by the latter turning red when boiled in an aqueous or aqueous-acid solution, whereas the former retain their blue color, being thus of great value in dyeing.

Having now described my invention, what I claim is—

1. The herein-described process for the manufacture of anthrachrysonedialkylesters and nitrosulfonic acids thereof, which consists in treating the sodium salt of anthrachrysone with sulfuric dialkylesters and in sulfonating the anthrachrysonedialkylethers thus obtained with fuming sulfuric acid and in nitrating them to dinitrodisulfonic acids, substantially as set forth.

2. The herein-described process for the manufacture of blue dyestuffs which consists in treating dinitroanthrachrysonedialkyletherdisulfonic acids with reducing agents, substantially as set forth.

3. As new products the blue dyestuffs obtained by reducing dinitroanthrachrysonedialkyletherdisulfonic acids, which, when dry and in form of their alkali salts are dark-blue-colored crystalline powders, soluble in water to a pure-blue solution, in concentrated sulfuric acid to an orange-yellow solution, which reassumes its blue color on being diluted with water; said dyestuffs dyeing unmordanted wool blue in an acid-bath.

In testimony that I claim the foregoing as my invention I have signed my name in presence of two subscribing witnesses.

HEINRICH LAUBMANN.

Witnesses:
ALFRED BRISBOIS,
BERNHARD LYDECKER.